May 30, 1972 R. J. KUHNS ET AL 3,666,603
APPARATUS FOR LAMINATING PRE-EMBOSSED I.D. CARDS
Filed April 28, 1970

ROGER J. KUHNS
BRUCE H. MACLEOD
INVENTORS.

BY Robert L. Nathans

ATTORNEY.

United States Patent Office 3,666,603
Patented May 30, 1972

3,666,603
APPARATUS FOR LAMINATING PRE-EMBOSSED I.D. CARDS
Roger J. Kuhns, Lincoln, and Bruce H. MacLeod, Littleton, Mass., assignors to Avant Incorporated, Lincoln, Mass.
Filed Apr. 28, 1970, Ser. No. 32,541
Int. Cl. B30b 15/34; B32b 31/20
U.S. Cl. 156—583                                     10 Claims

ABSTRACT OF THE DISCLOSURE

Apparatus for applying laminating pressure to heated sheets to be laminated having embossed indicia within a first area of the sheets and the absence of embossed indicia within a second area of the sheets, including a pressure applicator means for applying laminating pressure to the heated sheets solely within the second area thereof, the pressure applicator means including a pressure control member having a cutout portion overlaying the embossed indicia to prevent the application of laminating pressure and heat thereto, in order to enable pre-embossing of the sheets prior to lamination.

BACKGROUND OF THE INVENTION

Figure 2:
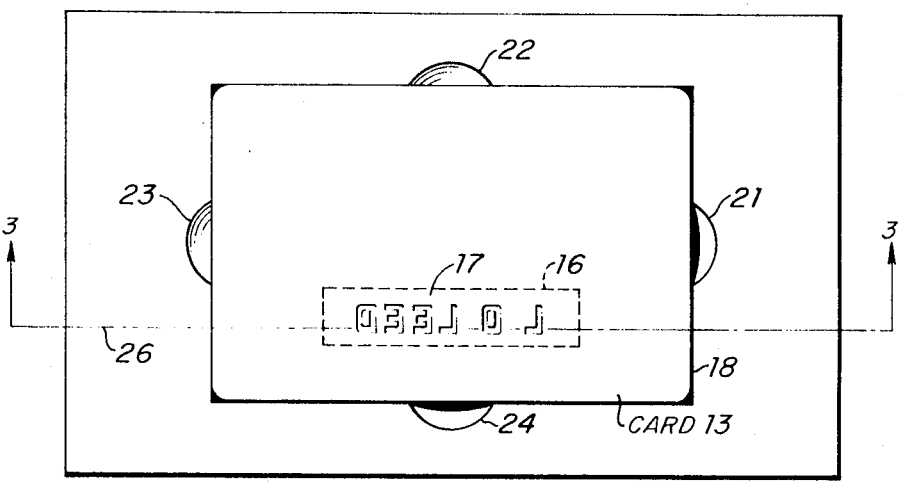

This invention relates to the field of laminating machines and especially machines for laminating I.D. cards.

Banks, factories, defense plants, universities, etc. produce I.D. cards on the premises which I.D. cards control the access to various facilities or may be utilized as licenses or credit cards, for example. The possibility of a dishonest employee fabricating a card for an unauthorized individual is a continuous problem in the field. For example, a dishonest bank employee could make up a card by photographing an unauthorized individual and thereafter laminate an unauthorized data card and the individual's photograph to form a credit card. The unauthorized individual, who would probably have a low credit rating or use an alias could thereafter use the card to the great detriment of the company liable for the use of the card, likewise with cards such as drivers' licenses. It is thus desirable for a bank to receive pre-embossed chips from the manufacturer of the plastic chips which comprise attached twin sheets of plastic and which receive the photograph and data card placed therein during lamination by the bank's employees. A list of say ten thousand potential credit card customers with good credit would be given to the chip manufacturer and he would pre-emboss the names of these customers upon the chips before they are shipped to the bank. This pre-embossing would discourage a dishonest employee from fabricating a card of an unauthorized individual. A further advantage of pre-embossing is that the pre-embossed chips could be mailed to potential customers and the potential customers could use the pre-embossed card on a temporary basis during the period before they report to the bank to sign the data card and be photographed. It is thought that by sending a temporary pre-embossed card to the customer, it might lower sales resistances. A further advantage of pre-embossing is that an individual who finds a pre-embossed card which has been discarded by the customer who receives the card in the mail cannot use the card by over-embossing his own name on it, since over-embossing will be apparent upon visual inspection thereof.

It is believed that the reason why the aforementioned pre-embossing has not been carried out in practice is because lamination of the card is generally performed over the entire face of the card and, therefore, the embossed indicia would be destroyed by the application of laminating pressure across the face of the card.

SUMMARY OF THE INVENTION

In accordance with a preferred embodiment of the present invention, a pressure control member is introduced between the pressure applicator of a laminating machine, which control member prevents application of laminating heat and pressure to the first area of the card bearing pressure destructible indicia such as embossed indicia. This pressure-free zone is precisely established by providing positioning means upon the pressure control member which maintains the position of the card and hence the zone bearing the embossed indicia in a fixed position so that pressure is not inadvertently applied to the zone bearing the indicia. The pressure control member includes a heat conductive plate having a cutout portion therein which overlays the zone bearing the embossed indicia to prevent the application of pressure thereto. The cutout portion is deeper than the embossed indicia so that a dead air space surrounds the indicia to sharply attenuate the flow of laminating heat which could melt the indicia. On the other hand, the plate is highly heat conductive so that the temperature of the card in the non-embossed zone is allowed to attain the temperature required for lamination.

Furthermore, if at any time zoning is to be eliminated, this may be done by merely removing the pressure control member.

Figure 1:
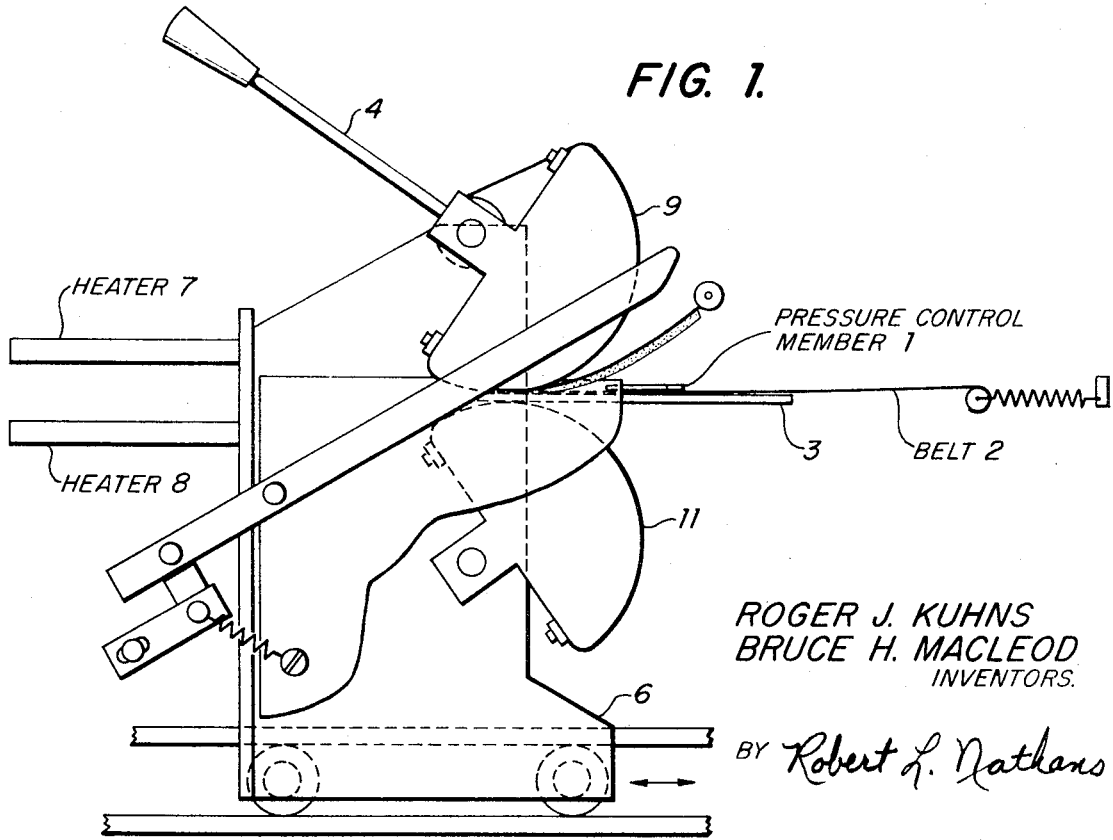

Other objects, features, and advantages of the present invention will become apparent from the perusal of the following detailed description taken in conjunction with the drawings in which:

FIG. 1 discloses a portion of a laminating machine which includes the aforesaid pressure control member;

FIG. 2 discloses a top view of the pressure control member; and

Figure 3:
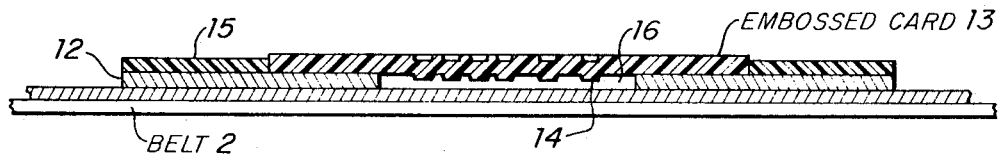

FIG. 3 discloses a side view of the pressure control member.

DETAILED DESCRIPTION

FIG. 1 illustrates a portion of the laminating machine more fully disclosed in allowed U.S. patent application 631,961, filed Apr. 19, 1967, and assigned to the same assignee as the present invention. Further details of the laminating machine disclosed in the application have no bearing on the present invention and are thus not included in the interest of clarity.

The aforementioned pressure control member having the cutout formed therein is designated by the numeral 1 in FIG. 1. The member rests upon a heat resistant belt 2 which overlays a support platform 3. The pressure control member 1 may be fixed to the belt 2 by means of an epoxy cement. Its position on the belt is not critical. As it will be described in further detail hereafter, the plastic chip to be laminated is inserted upon the control member and handle 4 is actuated to move carriage 6 to the right which in turn causes heaters 7 and 8 to heat the card positioned upon the control member. Handle 4 is thereafter actuated to the left to cause pressure platens 9 and 11 to "walk over" pressure control number 1 which causes laminating pressure to be applied only to the portions of the card not having embossed indicia thereon. The laminated card is thereafter removed from the pressure control number 1 and the cycle is completed.

As may be seen in FIGS. 2 and 3, the pressure control member comprises a first heat conductive plate 12 affixed to belt 2 as mentioned hereinabove, which belt in turn overlays support platform 3. The pre-embossed card 13 has embossed indicia thereon illustrated at 14. The card is positioned by a heat insulating second plate 15 which is cemented upon the first heat conductive plate 12. Cutout 16 is formed within plate 12 and is generally congruent with the first area or zone of the card 17 bearing the embossed indicia. A large cutout 18 is produced in the second heat insulating plate 15 and is roughly equal in size to the area of the card. This cutout forms a stop or positioning member for maintaining the cutout 16 formed in plate 12 congruent with the zone bearing the embossed indicia and thus card slippage and erroneous mashing of the embossed indicia is avoided.

Embossed card 13 is fitted within cutout 18 as shown. The depth of cutout 16 is greater than the height of indicia 14 so that a dead air space surrounds indicia 14, which space functions as a heat insulator to attenuate the flow of heat through the belt and to the indicia 14, which prevents indicia from being melted. On the other hand, because the first plate 12 is higly heat conductive, heat will readily flow through the belt and plate 12 to raise the temperature of the card 13 in the non-embossed areas to effect lamination. The height of the side walls of the second plate 15 is somewhat less than the height of the embossed card to insure the application of laminating pressure in the second card area which is free from embossed indicia. First plate 12 is constructed of aluminium whereas second plate 15 is made of Bakelite. Thumb holes 21, 22, 23, and 24 may be formed in the heat insulated plate to facilitate removal of the laminated card at the end of a laminating cycle. Because plastic plate 15 has a low heat conductivity, it will not assume an elevated temperature. Typical thicknesses of the components are as follows: The height of the embossed indicia is typically .018 inch and the depth of the cutout is .030 to .050 inch so as to provide for the aforementioned dead air space. The thickness of the second insulating plate is about .020 inch whereas the card thickness is .027 inch so as to insure the application of a laminating pressure to pre-embossed card 13.

In many cases, the pre-embossed indicia will be positioned in a rectangular zone so that the aforesaid cutout 16 in plate 12 will also be rectangular. The shape of the cutout, however, may be readily changed assuming that the first area bearing the embossed indicia is some other shape. It is preferred to make the area of the cutout no larger than the zone bearing the indicia so that the second areas of the card not bearing the indicia may be fully laminated. The sectional view of FIG. 3 is taken along sectional line 26. It should be understood that the term cutout need not necessarily be an empty space but could include a soft filler material such as a plastic foam. The important point is that in the cutout area, pressure is not transmitted to the overlaying embossed indicia. It is also conceivable that in some applications, laminating of credit cards, etc., may be effected without the application of heat.

Some machines currently on the market utilize continuous belts or trolleys for transporting the plastic cards past the heating and laminating stations. In accordance with the broadest aspect of the present invention, a cutout may be formed in a laminating roll. This cutout would be a cylindrical indentation or step which would surround the laminating roll so that the surface of the roll does not apply laminating pressure to the indicia bearing zone. However, in contrast to the present invention, this arrangement would require an entire unlaminated stripped area running the full length of the card which means that lamination would not occur even in areas not bearing embossed indicia. Furthermore, any shifts in the position of the card might ruin the embossed indicia, since the indicia would not be congruent with a stepped portion of the roll. This problem has been averted by positioning plate 15 as explained hereinabove. It is also possible to machine the cutout in platens 9 and 11 although such cutouts are relatively expensive to machine and a separate positioning means would still be desirable.

Obviously many modifications and variations of the present invention are possible in the light of the above teachings. It is therefore to be understood, that within the scope of the appended claims, the invention may be practiced otherwise than as specifically described.

We claim:

1. In a laminating maching for laminating a planar data card including first and second sheets by the application of heat and pressure thereto, at least one of said sheets having pressure destructible indicia within a first area of said sheets and the absence of said indicia within a second area constituting the entire remaining area of said sheets; and
   a pressure control member for selectively applying laminating heat and pressure to said data card within substantially the entire portion of said second area of said sheets for enabling wide area lamination of said data card and yet provide for the application of said pressure destructible indicia within said first area prior to lamination.

2. The combination as set forth in claim 1 wherein said pressure control member further comprises a pressure plate for applying pressure to said sheets having a cutout portion therein overlaying said first area of said sheets for preventing the application of pressure to said first area of said sheets.

3. The combination as set forth in claim 2 wherein said first plate is made of heat conductive material.

4. The combination as set forth in claim 3 wherein the cutout portion of said plate is deeper than the height of the indicia of said sheets for producing a dead air space surrounding said indicia having a low degree of heat conductivity.

5. The combination as set forth in claim 1 further including positioning means for maintaining a predetermined relationship between the position of said sheets and the position of said pressure control member during lamination to prevent the application of laminating pressure to said first area of said sheets.

6. The combination as set forth in claim 2 further including positioning means positioned adjacent said pressure plate for fixing the position of said sheets with respect to said pressure plate during lamination.

7. The combination as set forth in claim 6 wherein said positioning means has a low degree of heat conductivity to facilitate removal of said sheets after lamination from said machine.

8. The combination as set forth in claim 3 further including a second plate affixed to said first plate, said second plate having a cutout portion therein larger than the cutout portion of said first plate.

9. The combination as set forth in claim 8 wherein said second plate has a low degree of heat conductivity to facilitate removal of said sheets after lamination, from said machine.

10. In a laminating machine for laminating sheets by the application of pressure thereto, at least one of said sheets having pressure destructible indicia within a first area of said sheets to be laminated and the absence of said indicia within a second area of said sheets to be laminated, the improvement comprising:
    a pressure applicator for selectively applying laminating pressure to said sheets solely within at least portions of said second area of said sheets and not within said first area of said sheets to enable the application of said indicia to said sheets within said first area, prior to lamination;
    said pressure applicator further comprising a first flat plate for applying pressure to said sheets having a cut out portion therein overlaying said first area of said sheets for preventing the application of pressure to said first area of said sheets and;

positioning means for maintaining the position of said sheets relative to said pressure applicator during lamination, said positioning means further comprising a second flat plate affixed to said first flat plate, said second flat plate having a cut out portion therein larger than the cut out portion of said first flat plate for containing said sheets to be laminated.

References Cited

UNITED STATES PATENTS

| | | | |
|---|---|---|---|
| 3,510,379 | 5/1970 | Heimberger | 156—322 X |
| 3,483,060 | 12/1969 | Yow-Jiun Hu | 156—583 X |
| 3,520,756 | 7/1970 | Denaro et al. | 156—583 |

BENJAMIN A. BORCHELT, Primary Examiner

J. J. DEVITT, Assistant Examiner

U.S. Cl. X.R.

156—322